April 22, 1969     MINORU SUZUKI     3,439,600
INTERCHANGEABLE LENS CAMERA
Filed July 22, 1966     Sheet 1 of 2
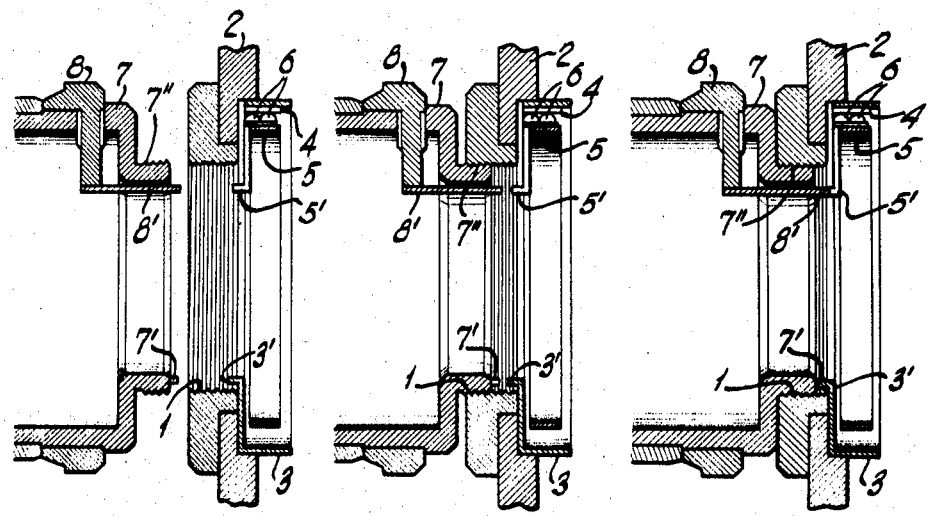
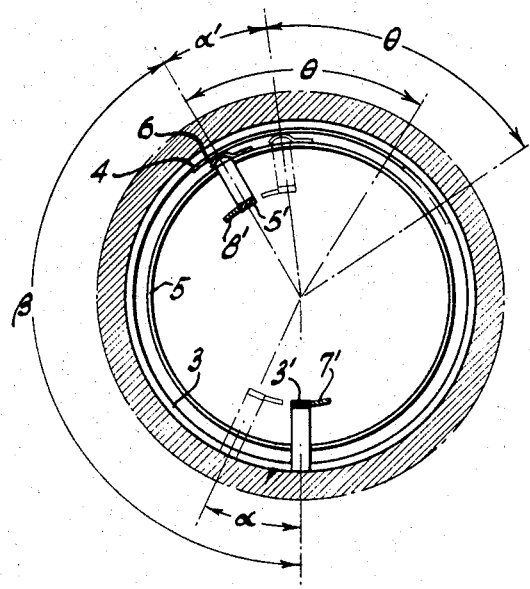
INVENTOR.
MINORU SUZUKI
BY Stanley Wolder
ATTORNEY

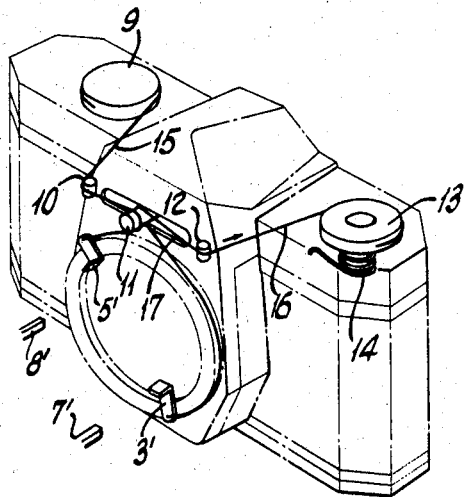
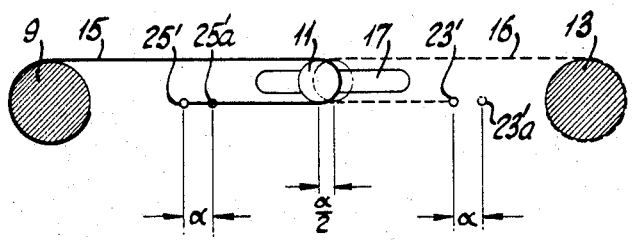

United States Patent Office 3,439,600
Patented Apr. 22, 1969

3,439,600
INTERCHANGEABLE LENS CAMERA
Minoru Suzuki, Tokyo-to, Japan, assignor to Asahi Kogaku Kogyo Kabushiki Kaisha, Tokyo-to, Japan, a corporation of Japan
Filed July 22, 1966, Ser. No. 567,178
Claims priority, application Japan, Aug. 19, 1965, 40/50,119
Int. Cl. G03b 3/00
U.S. Cl. 95—44                4 Claims

ABSTRACT OF THE DISCLOSURE

A camera includes a control mechanism, for example a variable resistor, provided with a first control element and a screw coupled interchangeable lens barrel provided with a second control element engageable with the first control element. Means are provided for compensating the control mechanism for variations in the lens coupling and includes a first adjusting element directed rearwardly from the lens barrel and a second forwardly projecting adjusting element connected to the control mechanism and lying in the circumferential path of the first control element, so that the control mechanism is adjusted in accordance with the relative position of the lens barrel.

---

The present invention relates to improvements in cameras having control mechanisms in the body of the camera which are controlled by adjustable elements mounted in interchangeable lens barrels coupled to the camera body, and it relates more particularly to an improved camera provided with a screw coupled interchangeable lens barrel carrying a movable adjustment element engaging a camera body carried adjustable machanism.

In the conventional focal plane shutter camera, it is comparatively simple to couple such camera body positioned members as the shutter setting member or the film sensitivity setting member to the exposure meter. However, in this type of camera, to couple the diaphragm of the objective section to the exposure meter positioned on the camera body section requires a highly accurate and complicated coupling mechanism, particularly where the objective lens barrel is interchangeably connected to the camera body member by a screw coupling. The fully screwed-in or coupled position of the objective barrel relative to the camera body must be always kept constant, an index on the objective barrel being in registry with another index on the camera body. Due to differences in the habitual practices of different operators, the final screwed-in or coupled position of the objective barrel on the camera body is not always uniform and constant. Thus, when the turning of the barrel mounted diaphragm ring is to be transmitted to the camera body section, the accuracy of the diaphragm coupling operation may be greatly reduced, resulting in an erroneous transmission of the diaphragm value.

In order to eliminate the above disadvantage, there has been employed a means wherein the turning movement of the diaphragm ring is converted to an axial movement which is transmitted to the camera body section whereby to account for lens barrel position variation, and further such means as a bayonet mount or spigot mount has been used to bring the objective barrel index to a fixed position. In the former means, however, the accuracy is appreciably lowered if a predetermined axial displacement is not effected, and the objective barrel structure is highly complicated. While the latter means is employed to advantage in effecting an accurate setting to a predetermined position and rapid mounting and demounting operations, it is considerably costlier than the screw-mount or coupling systems and is frequently loosened.

It is, therefore, desirable to transmit the objective barrel mounted diaphragm value to camera body section in an accurate and reliable manner where the objective barrel adjustment member is screw coupled, a system which is the most secure and the most inexpensive lens barrel mounting system in general use.

It is thus a principal object of the present invention to provide an improved interchangeable lens camera provided with a camera body supported control or adjusting mechanism and a control element mounted to the lens barrel and operatively associated with the body supported control mechanisms.

Another object of the present invention is to provide an improved camera having a screw coupled interchangeable lens barrel and a body carried control mechanism operated by a member mounted on the lens barrel wherein the selective control of the control mechanism is substantially independent of the relative position or degree of coupling between the objective lens barrel and the camera body.

Still another object of the present invention is to provide an improved system for connecting the lens barrel and a lens barrel mounted diaphragm control ring to an exposure control mechanism mounted to the camera body section in which the lens barrel is screw coupled to the camera body and the adjustment of the exposure control mechanism is independent of the degree of coupling of the lens barrel.

A further object of the present invention is to provide a lens barrel coupling and exposure control system of the above nature characterized by its accuracy, reliability, simplicity, ruggedness and low cost.

The above and other objects of the present invention will become apparent from a reading of the following description taken in conjunction with the accompanying drawing, wherein:

FIGURE 1 is a fragmentary longitudinal sectional view of a lens barrel and a camera body member housing a control mechanism illustrated in a fully uncoupled condition;

FIGURE 2 is a view similar to FIGURE 1 illustrated in a partially coupled condition;

FIGURE 3 is a vew similar to FIGURE 1 illustrated in a fully coupled condition;

FIGURE 4 is a front transverse sectional view illustrating the relationship of the objective barrel and the camera body;

FIGURE 5 is a fragmentary perspective view of another embodiment of the present invention; and FIGURE 6 is a schematic view illustrating the operative association of the adjustment and control elements.

In a sense, the present invention contemplates the provision of a camera including a camera body member and a lens barrel separably screw coupled thereto, a control mechanism mounted to said body member and including a first control element, a second control element movably mounted on said barrel and adapted to engage said first control element, and compensating means for adjusting said control mechanism in response to the position of said barrel on said body member.

According to a preferred form of the present camera the control elements are movable along circular paths about the axis of the objective barrel, the first control element comprising a member projecting rearwardly from the control mechanism and the second control element comprising a member connected to the diaphragm control ring and projecting rearwarly through the barrel, the control elements being in circumferential registry when the axial distance of the objective barrel from its completely coupled position does not exceed the lead of the coupling screw. The compensating means includes an adjusting member projecting rearwardly from the barrel wall and another adjusting member projecting forwardly from the control mechanism, and rotatable therewith, the adjusting members being in circumferential registry when the axial distance of the objective barrel from its completely coupled condition does not exceed the lead of the coupling screw.

Referring now to the drawings, and particularly FIGURES 1 to 4 thereof which illustrate a preferred embodiment of the present invention, the reference numeral 2 generally designates a camera casing or body which is provided with an internally threaded screw-mount or coupling bushing member 1. A rotatable ring 3 is coaxially arranged behind the screw-mount member 1 and is provided with a forwardly directed compensating projection or adjustment element 3' extending toward the screw-mount member 1 and also with an electric resistor 4 extending circumferentially along the inside thereof. A diaphragm coupled ring 5 is loosely and rotatably coaxially positioned inside the ring 3 and is provided with a contact member 6 arranged at a peripheral portion thereof and in sliding contact with the resistor 4. An objective barrel 7 has an externally rear threaded portion 7'' whose end is provided with a rearwardly directed projection 7' opposed to the compensating projection 3'. A diaphragm ring 8 is rotatably mounted on the barrel 7 and is provided with a rearwardly directed projection 8' opposed to a forwardly directed coupling member 5' carried by the diaphragm coupled ring 5. The ring 3 and the diaphragm coupled ring 5 are normally urged counterclockwise in any suitable manner as viewed in FIGURE 4.

The compensting projection 3' and the projection 7', and also the coupling member 5' and the projection 8' are so related to each other that, when the objective barrel 7 has reached such position as to leave one full turn before the final screwed-in position, that is, the distance of the lead of the screw coupling, they do not engage each other, a small space being still left therebetween; and that they will engage each other during said last full turn of the objective barrel 7. It is desirable that the spacing distance S between the compensating projection 3' and the projection 7' and also between the coupling member 5' and the projection 8' satisfy the following relation;

$$M < S \leq \tfrac{1}{2} D$$

where D is the axial displacement of the objective barrel 7 due to one full turn thereof, that is the screw lead, and M is the axial machining error of the screw-mount portion and the coupling arrangement.

Thus, with the objective barrel 7 at the position with still a full turn to go before the fully screwed-in coupled position the compensating projection 3' and the projection 7' and also the coupling member 5' and the projection 8' do not engage each other, with a small axial space therebetween as seen in FIGURE 2 and engagement of the respective pairs of projections 3', 7' and 5', 8' is effected during the final full turn of the objective barrel 7 as seen in FIGURE 3.

Assuming that an angular error $\alpha$ occurs in connection with the fully mounted position of the objective barrel 7 relative to the screw-mount member 1, since the angle $\beta$ between the projection 8' at the fully open or minimum aperture diaphragm position and the projection 7' is kept constant, upon the above mentioned engagement, the angular displacement $\alpha$ of the compensating projection 3' due to engagement with the projection 7' causes a simultaneous angular displacement $\alpha$ of the diaphragm coupled ring 5 due to engagement of the projection 8' with the coupling member 5'. Thus, the ring 3 and the diaphragm coupled ring 5 are moved as a unit by the error angle of the objective barrel 7 so that no relative displacement is caused in the mutually coupled arrangement. In FIGURE 4 there is shown the angular range $\theta$ of effective displacement causes corresponding movement of the diaphragm coupled ring 5, thus establishing in the exposure meter circuit, with the resistor 4, a resistance value corresponding to the diaphragm aperture value independent of any error in the coupling or mounting of the barrel 7.

Referring now to FIGURES 5 and 6 which illustrate another embodiment of the present invention, a shutter dial 9 is connected to the coupling member 25' of the diaphragm coupled ring by means of a wire 15 passing about a roller 10 and a movable roller 11; and an EV (Exposure Value) plate 13 is connected to the compensating projection 23' by means of a wire 16 passing about a roller 12 and a movable roller 11. The EV plate 13 and the wire 16 are tensioned by a spring 14 in the direction of the arrow so that after the objective is mounted the compensating projection 23' is resiliently held at a constant position opposite to the projection 27'. The movable roller 11 is so arranged that it can be displaced along the transverse guide slot 17. The structure and relationships of the projections 23', 25', 27' and 28' and the associated lens barrel and body member are similar to those of the projections 3', 5', 7' and 8' of the first described embodiment.

If the error in the final mounted position of the objective barrel is $\alpha$ as seen in FIGURE 6, the corresponding error displacement $\alpha$ of the compensating projection 23' and of the coupling member 25' will bring them to points 23'a and 25'a, respectively. At the same time, the movable roller 11 is displaced by the distance $\alpha/2$ along the guide slot 17, rotating counterclockwise on FIG. 6; while the dial 9 and the EV plate 13 remain unmoved. Thus the error of the objective barrel position relative to the camera body is eliminated by the displacement of the movable roller 11.

Movement of either of the coupling member 25' and the shutter dial 9 does not cause any movement of the other, the result being only displacement of the movable roller 11 along the guide slot 17. Thus, when the dial 9 is turned, the movable roller 11 is displaced and the indication of the EV plate 13 is changed. In order to set the diaphragm according to the preset shutter speed and the photographing condition EV, the operator turns the diaphragm ring until, through the displacement of the coupling member 25' and also of the movable roller 11, the EV plate 13 indicates the corresponding photographic condition EV. If, on the other hand, the diaphragm value is predetermined, the operator turns the dial 9 until the EV plate 13 indicates the photographic condition EV.

While there have been described and illustrated preferred embodiments of the present invention it is apparent that numerous alterations, omissions and additions may be made without departing from the spirit thereof.

What is claimed is:

1. In combination with a camera including a camera body member and a lens barrel separably screw coupled thereto, a control mechanism mounted to said body member and including a first control element, a second control element movably mounted on said barrel and adapted to engage said first control element, and compensating means for adjusting said control mechanism in response to the position of said barrel on said body member, and including means comprising a first adjusting element mounted on and projecting rearwardly of said barrel and axially and rotatably movable therewith, and a second forwardly projecting adjusting element connected to said control mechanism and rotatable about the axis of said barrel and located in the circumferential path of said first adjusting element when the axial distance of said barrel from its fully coupled position does not exceed the lead of said screw coupling between said barrel and said body member.

2. The combination of claim 1 wherein said first and second control elements are forwardly and rearwardly projecting respectively and movable in circular paths about the axis of said barrel, said control elements being in circumferential registry only when the axial distance of said barrel from its fully coupled position does not exceed the lead of said screw coupling between said barrel and said body member.

3. The combination of claim 1 wherein said control mechanism comprises a variable resistor including a resistance element and movable contact element engaging said resistance element, and said second adjusting element is connected to one of said variable resistor elements.

4. The combination of claim 1 wherein the free ends of said adjusting elements are in circumferential registry when the axial distance of said barrel from its fully coupled position is between ½ said screw coupling lead and the maximum machining error of said screw coupling in an axial direction.

References Cited
UNITED STATES PATENTS

| | | | |
|---|---|---|---|
| 2,467,456 | 4/1949 | Baer | 95—44 |
| 2,830,513 | 4/1958 | Sauer | 95—44 |
| 2,897,739 | 8/1959 | Gebele | 95—64 |
| 2,985,085 | 5/1961 | Gebele | 95—44 |
| 3,046,862 | 7/1962 | Müller | 95—64 |

NORTON ANSHER, *Primary Examiner.*

C. B. FUNK, *Assistant Examiner.*

U.S. Cl. X.R.

95—64